(12) United States Patent
Facciano

(10) Patent No.: US 8,701,617 B2
(45) Date of Patent: Apr. 22, 2014

(54) COMBUSTION CHAMBER PROMOTING INCREASED AIR INDUCTION FLOW

(76) Inventor: Joseph Facciano, Burbank, CA (US)

(*) Notice: Subject to any disclaimer, the term of this patent is extended or adjusted under 35 U.S.C. 154(b) by 217 days.

(21) Appl. No.: 13/286,941

(22) Filed: Nov. 1, 2011

(65) Prior Publication Data
US 2013/0104836 A1 May 2, 2013

(51) Int. Cl.
*F02B 23/08* (2006.01)

(52) U.S. Cl.
USPC ........................... 123/193.5; 123/668

(58) Field of Classification Search
USPC .................. 123/193.5, 267, 308, 668
See application file for complete search history.

(56) References Cited

U.S. PATENT DOCUMENTS

| | | | | |
|---|---|---|---|---|
| 4,006,725 A | * | 2/1977 | Baczek et al. | 123/267 |
| 4,254,750 A | * | 3/1981 | Tanahashi et al. | 123/269 |
| 4,398,527 A | * | 8/1983 | Rynbrandt | 123/668 |
| 4,719,880 A | * | 1/1988 | Schlunke et al. | 123/65 WA |
| 5,941,221 A | * | 8/1999 | Marocco et al. | 123/657 |
| 2002/0185105 A1 | * | 12/2002 | Martin et al. | 123/308 |

* cited by examiner

*Primary Examiner* — M. McMahon
(74) *Attorney, Agent, or Firm* — James A. Italia; Italia IP

(57) ABSTRACT

A combustion chamber for an internal combustion engine, adapted to promote induction air flow. The combustion chamber has a bulge located near an intake valve head. The bulge projects away from the piston and forms that part of the combustion chamber farthest from the piston. Slope of the walls of the bulge is greater than the angle of the head of the intake valve relative to the deck of the engine block, in engines having separate cylinder heads. The bulge is curved so as to make seamless transition with the cylinder wall at that portion away of the bulge which is distant from the intake valve.

2 Claims, 5 Drawing Sheets

COMBUSTION CHAMBER PROMOTING INCREASED AIR INDUCTION FLOW

FIELD OF THE INVENTION

The present invention relates to internal combustion engines, and more particularly, to configuration of a combustion chamber which significantly increases flow of induction air.

BACKGROUND OF THE INVENTION

For various reasons such as minimizing engine size and complexity for any given application, it is desirable to maximize power output of internal combustion engines of any given displacement. Specific power is dependent upon specific torque and also crankshaft rotational speeds. Both of these have been maximized or increased in various ways by those seeking to increase overall power. Torque output of internal combustion engines is limited by the amount of air which can be induced into a cylinder in any one induction event to support combustion of fuel. Efforts to increase flow of inducted air have lead to increasing intake valve area, providing more streamlined induction manifolds, and relying upon external air pumping or compressing apparatus to force more air into the cylinders than would otherwise occur.

The latter approach, or supercharging, is by far the most effective way of increasing air flow into the engine. However, supercharging entails additional components, resulting in additional complexity, cost, and demands on engine bay space which may be at a premium. Some forms of supercharging impose parasitic loads on engine power output just to support forced induction.

Modified intake ports and combustion chambers have been proposed to improve induction flow in engines. However, the present applicant is unaware of engine designs having portions of the combustion chamber project away from the piston to a degree greater that that portion of the combustion chamber which accommodates intake and exhaust valves.

Such a modification is seen in U.S. Pat. No. 1,903,159, issued to Asbury on Mar. 28, 1933. However, the bulge formed in the combustion chamber away from the piston beyond the valves does have characteristics adapted to promote improved induction flow.

There remains space in the prior art for an improved combustion chamber which increases induction air flow into an internal combustion engine.

SUMMARY OF THE INVENTION

The present invention addresses the above stated need by providing engine structure which significantly increases induction air flow without the disadvantages of significantly increasing the cost of the engine, the number of moving parts, space demands, complication of the engine assembly, and parasitic loads imposed on the engine to support forced induction.

It has been discovered that reshaping the combustion chamber to promote induction air flow may be realized. The novel modification is in many ways counterintuitive to contemporary combustion chamber design. That is, a bulge is introduced into the combustion chamber which projects away from the piston, seemingly unnecessarily increasing combustion chamber volume and surface area. In some ways, this is similar to the design of Asbury. However, important differences between the present invention and the design of Asbury are effective to increase induction air flow.

Notably, a flow path is established at one side of the intake valve, which removes impediments to intake flow at that location which have occurred in known prior art combustion chamber designs.

As for potential undesirable increases in combustion chamber volume, these may be mitigated by modifying piston crown design to occupy the newly increased combustion chamber volume, thereby restoring otherwise lost compression ratios. Also, impairment of combustion chamber surface area may offset by the increased power output resulting from the increased air flow, and may be mitigated by modifying squish and swirl characteristics of the combustion chamber by appropriate modifications to the piston crown.

The novel modification is particularly advantageous when applied to engines having poppet valves the stems and motion of which are disposed at an acute angle to the axis of the cylinder. A widely utilized valve layout is to have two valves, one intake valve and one exhaust valve, arranged side by side of one another and with stems parallel to one another. This arrangement enables a highly compact valve and valve drive train to be realized. The present invention cooperates with this widely utilized valve layout in that it directly addresses what would otherwise be geometric implications which greatly impair induction air flow at one side of the valve.

Because the valves are inclined relative to the axis of the cylinder, it follows that one side of the head of the valve, that closest to the piston, will be disposed at an angle which promotes induction flow volume. However, the opposite side is disadvantageously inclined for induction flow volume. While not wishing to be bound by any particular theory of operation, it is believed by the inventor that the bulge in the open space of the combustion chamber introduced by the novel modification restores unimpeded flow of induction air that was lost by introducing inclination of the valve. Highly effective patterns of air flow entering the cylinder result from the novel modification, leading to increased engine output of both torque and ultimate horsepower.

It is an object of the invention to increase induction air flow into combustion chambers of internal combustion engines.

Another object of the invention is to provide increased induction with minimal reliance upon forced induction requiring added engine components, and minimal cost, complexity, and moving parts.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
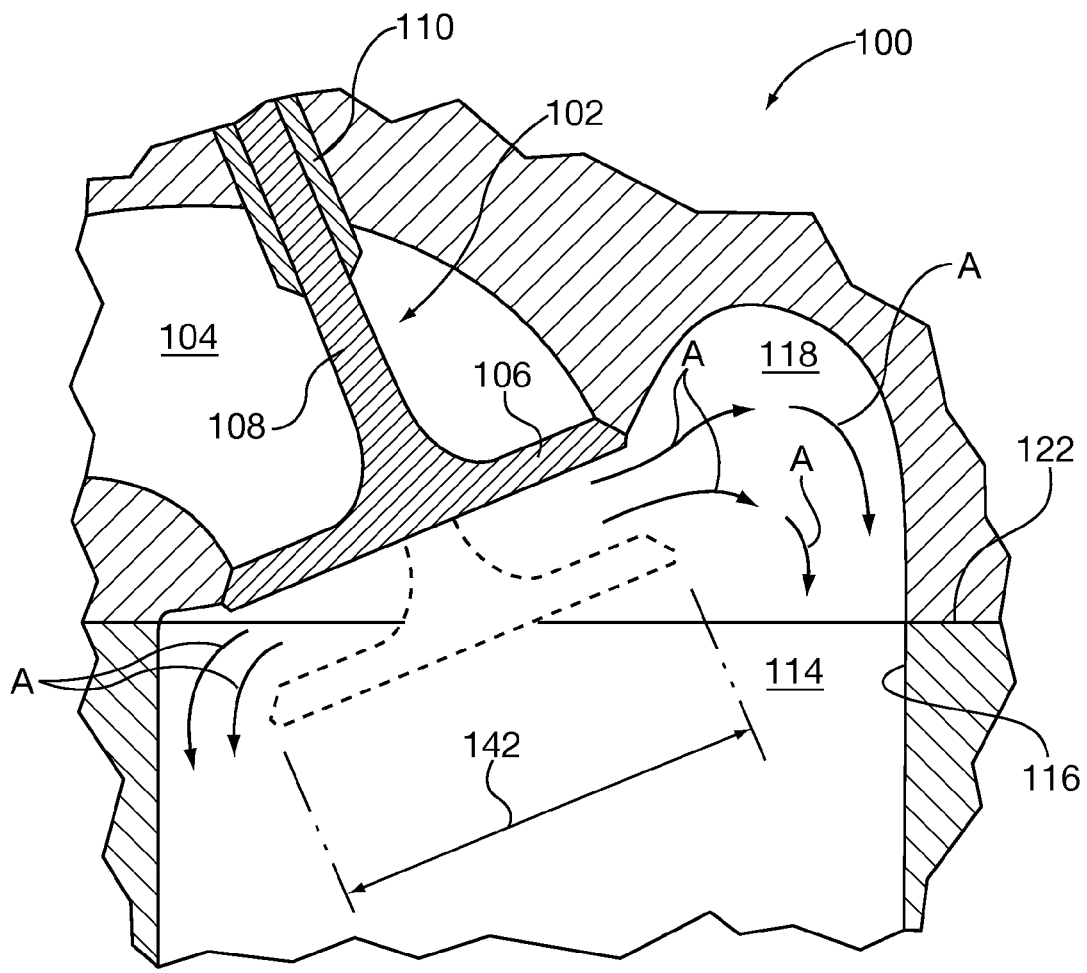
FIG. 1 is a diagrammatic cross sectional view of a portion of a cylinder head comprising a combustion chamber incorporating characteristics according to at least one aspect of the present invention.

Referring first to FIG. 1, according to at least one aspect of the invention, there is shown a cylinder assembly 100 which will be understood to comprise a portion of an engine assembly 10 (seen in FIG. 2) further comprising an engine block 12, cylinder head assemblies 14, 16, and other conventional parts of an engine (other conventional parts or components are not shown). Apart from incorporating novel principles regarding combustion chamber design, the engine assembly 10 may be conventional, such as being an eight cylinder engine of configuration known as V8. Of course, because the novel concept applies to individual combustion chambers, the invention may be applied to engines of other configurations and differing in the number of cylinders. The precise constructional details of engines will not be set forth, apart from noting that engines improved by the present invention may be reciprocating piston internal combustion engines such as the engine assembly 10. The engine assembly 10 may comprise an engine block such as the engine block 12, which supports at least one cylinder enclosing a piston (not shown) slidably and reciprocably disposed within the cylinder. The engine assembly 10 will be understood to comprise an output shaft supported by the engine block, such as a crankshaft; a power linkage which operably conducts power developed by reciprocation of the piston within its associated cylinder to the output shaft, such as a connecting rod for each piston, or a more complicated linkage, such as the various arms and linkage rods used in Atkinson cycle engines; and at least one cylinder head. In engines having separate banks of cylinders, as is typical of the V8 type engine depicted in FIG. 2, one cylinder head assembly 14 or 16 is required for each bank of cylinders. In other arrangements, the number of cylinder head assemblies may be one, three, or still more than three (these engine arrangements are not shown).

It may be noted here that some engines have been built having integral cylinder heads. The novel principles set forth herein are equally applicable to such engines where feasible. For example, the novel principles would apply where poppet valves may be installed by insertion through the cylinder (this option is not shown).

Engines to which the present invention is applicable will be understood to have a combustion chamber defined in the cylinder head assembly for each cylinder. The engine improved by the present invention may be provided with one or more intake manifolds (such as the intake manifold 18) or corresponding structure which provides an induction path disposed to conduct fresh combustion air to each cylinder. Structure for providing an exhaust path disposed to conduct spent combustion products away from each cylinder, such as exhaust manifolds 20, 22 may be provided.

Some illustrative engines many of which are currently in use will be listed by way of non-limiting examples. Single cylinder engines are in widespread use for small appliances, such as lawn mowers, boat trolling motors, and others. Two cylinder engines are in widespread use in motorcycles, garden tractors, and other applications. Three, four, five, six, and eight cylinder engines are widely used in automobiles. Seven and nine cylinder engines have been used in aircraft. Ten and twelve cylinder engines have been used in high performance automobiles. In-line engines of up to fourteen cylinders are used in large ships such as supertankers. Sixteen cylinder engines have been utilized in the past for luxury automobiles. Any of these types of engines and others may be improved by incorporation of the present invention.

Therefore, although reference is made to complete engines, description set forth herein will concentrate only on those portions of engines which are intimately influenced by the novel principles.

Although these portions of engines may be conventional, further description of a combustion chamber will be set forth. The combustion chamber closes one end of its associated cylinder, and may be regarded as comprising the solid, typically cast and machined metallic portion of the cylinder head assembly, such as the cylinder head assemblies 14, 16, or depending upon context, may refer to the void or open space defined by the solid metal portion of the cylinder head assembly in which air and fuel are received and combusted.

For each cylinder such as the exemplary cylinder assembly 100, an intake valve 102 is disposed in the induction path seen as a port 104, which is disposed to open and close the induction path to flow of fresh combustion air to its associated cylinder assembly 100. The intake valve 102 is a poppet valve having an intake valve head 106 and a valve stem 108. The valve stem 108 may be slidably mounted within a valve guide 110. It will be understood that an exhaust valve 112 (concealed from view in FIG. 1, but seen in FIG. 3) is also provided, and is disposed in the exhaust path to open and close the combustion chamber to the exhaust path. The exhaust path is not shown per se, but is conventional, and may comprise for example ports (not shown) formed in the cylinder head assemblies 14 and 16 which correspond to the intake port 104 but which lead to internal passages of the exhaust manifolds 20 and 22. The exhaust valves such as the exhaust valve 112 may be similar in construction to the intake valve 102, having exhaust valve head and a stem (neither shown).

Figure 2:
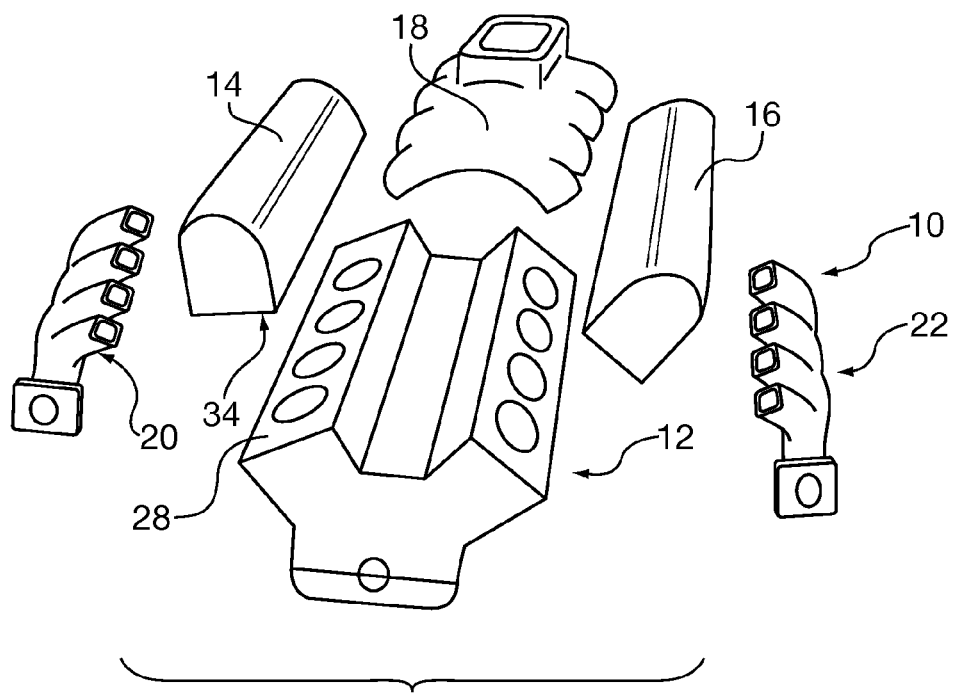
FIG. 2 is a diagrammatic exploded perspective view of major components of an engine which may be provided with combustion chambers incorporating characteristics according to at least one aspect of the present invention.

Benefits of the novel combustion chamber are best explained by comparing FIGS. 1 and 2. In FIG. 1, a combustion chamber 114 is defined within a cylinder assembly such as the cylinder assembly 100. The open space of the combustion chamber 114 adjoins the open space of its associated cylinder 116. The open space of the combustion chamber 114 is sealed above the cylinder 116 by the walls of the cylinder head assembly, such as the cylinder head assembly 14, subject to opening and closing of the intake and exhaust valves 102, 112.

It should be noted at this point that orientational terms such as above and below refer to the subject drawing as viewed by an observer. The drawing figures depict their subject matter in orientations of conventional practice, which could obviously change with changes in engine design and mounting within an associated motor vehicle (not shown). For example, it is known to mount an engine with its crankshaft located above the cylinder heads. Therefore, orientational terms must be understood to provide semantic basis for purposes of description, and do not limit the invention or its component parts in any particular way.

The intake valve 102 is shown in the closed position in solid lines, and in the open position in broken lines in FIG. 1. Arrows A indicate flow of induction air responsive to descent of the piston (not shown) within the cylinder 114 and opening of the intake valve 102.

Figure 6:
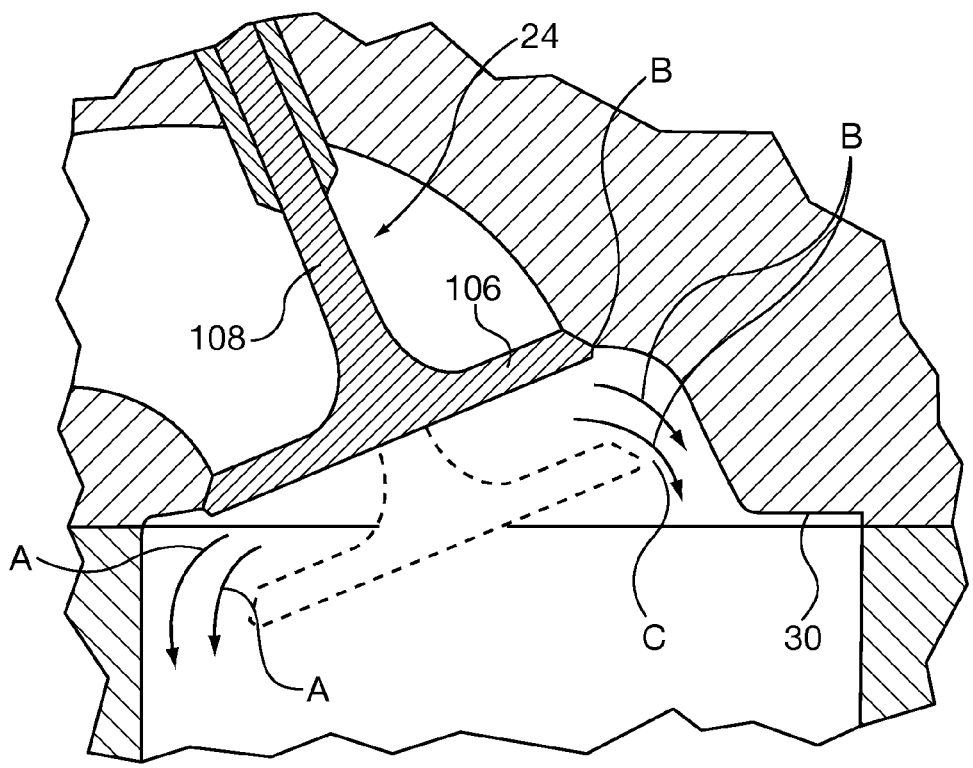
FIG. 6 is a diagrammatic cross sectional view of a portion of a prior art cylinder head.

Turning momentarily to FIG. 6, a corresponding situation is depicted in a conventional engine (not shown in its entirety). In the conventional engine, air flow indicated by arrows B must negotiate a restricted passageway defined between a surface C of the intake valve 24 (shown in the open position in broken lines) and a nearby portion D of the wall of the combustion chamber. This restricted passageway severely reduces flow of induction air at that portion of the intake valve 24 seen as maximally elevated above the cylinder 26. By contrast, and again referring to FIG. 1, the profile of the combustion chamber 114 is modified to provide a large space to receive air flow unimpeded, which large space is bounded by gently curved surfaces. This large space, seen at the right of the head 106 of the intake valve 102, will be referred to as a bulge 118. The bulge 118 enables induction air entering the combustion chamber 114 to enjoy a flow path of relatively greater cross section compared to the flow path of the conventional engine of FIG. 6, and also avoids a severe bend which is present in the flow path of the conventional engine as air flows past the point C.

Figure 4:
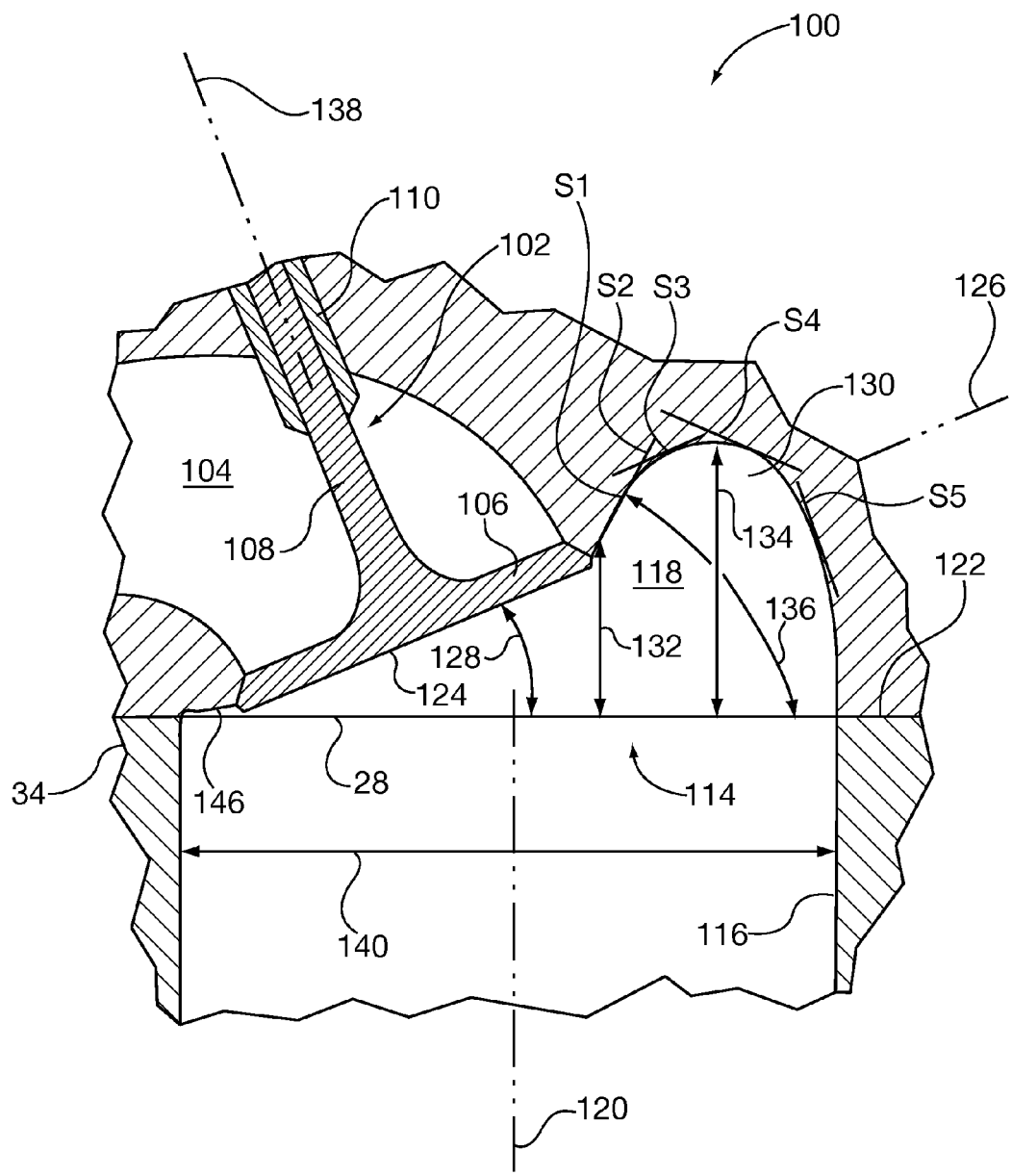
FIG. 4 is generally similar to FIG. 1, but is modified to show geometric relationships.

Turning now to FIG. 4, characteristics of the combustion chamber 114 which is improved by provision of the bulge 118 may be best explained in terms of the following geometrical characteristics. Firstly, the cylinder 116 may be said to have an axis 120, which serves to provide semantic basis in defining a reference plane 122.

The reference plane 122 is perpendicular to the axis 120, and is located above the piston (not seen in FIG. 4) and below the intake valve 102, or alternatively stated, between the piston and the intake valve 102. The reference plane 122 establishes a direction which will be relied upon to define geometric angles and slopes, and therefore need not be located at a specific rigidly defined point along the axis 120. In practice, in engines having separate engine blocks and cylinder head assemblies, such as the engine block 12 and the cylinder head assembly 14, a typically planar, machined surface or deck 28 serving as an interface of abutment of the cylinder head assembly 14 and the engine block 12 satisfactorily defines one reference plane for the engine assembly 10.

That portion of the head 106 of the intake valve 102 which faces the combustion chamber 114 and the cylinder 116, which is seen as a downwardly facing lower surface 124, may be said to define a valve head plane 126. The valve head plane 126 is disposed at an acute angle 128 to the reference plane 122. The acute angle 128 made by the valve head plane 126 of the intake valve 102 relative to the reference plane 122 may be in a range of five to forty-five degrees, and more specifically, may be in a range of twenty to twenty-five degrees.

The bulge 118 projects above the reference plane 122, or away from the piston, and opens towards the piston. The bulge 118 has a distal portion 130 located further from the piston than any part of the head 106 of the intake valve 102 is located from the piston. This is seen by comparing a height indicating line 132 to a height indicating line 134. The height indicating line 132 indicates distance of the highest point on the head 106 of the intake valve 102 above the reference plane 122. The height indicating line 134 indicates distance of the highest point of the bulge 118 above the reference plane 122.

The bulge 118 is bounded by a wall having a wall portion which is located proximate the head 106 of the intake valve 102, which wall portion has a slope S1 which is arranged at an acute angle 136 to the reference plane 122 and which is greater than the acute angle 128 of the valve head plane 126 relative to the reference plane 122.

The surface of the bulge 118, starting at that portion of the bulge 118 which is relatively near the intake valve 102, has slopes (seen as lines S1, S2, S3) which sequentially reduce in magnitude of the acute angle defined between the slope (S1, S2, or S3) and the reference plane 122 with increasing distance from the intake valve 102. It will further be noted that additional slope lines such as the lines S4 and S5 taken with still increasing distance from the intake valve 102 continue the trend established by relative slopes of the slope lines S1, S2, S3.

This is indicative of a rounded, domed configuration of the bulge 118, at least at that point farthest from the piston when considered in a cross section which also cross sects the intake valve, as seen in FIG. 4. However, as explained hereinafter with respect to FIG. 5, the bulge 118 need not necessarily be continuously curved along its full extent.

A further characteristic of the bulge 118 is that the wall of the bulge 118 makes a continuous transition towards coincidence with the wall of the cylinder 116. That is, the profile of the bulge 118 continues to change in slope progressively with increasing distance from the head 106 of the intake valve 102 such that the surface of the bulge 118 merges seamlessly with the wall of the cylinder 116. Alternatively stated, as depicted in the cross section of FIGS. 1 and 4, which are cross sections which cross sect both the combustion chamber 114 and also the intake valve 102, the bulge 118 has a profile which is curved continuously along most of its extent from the intake valve 102 to its point of coincidence with the wall of the cylinder 116. This enables induction air flowing into the cylinder 116 to avoid interruption of orderly flow as it enters the space of the cylinder 116.

Continuing to refer to FIG. 4, an engine according to at least one aspect of the present invention may display the following geometric relationships. The bulge 118 may have a height as indicated by the height indicating line 134 which is within a range of one and one half times to one and four fifths times the greatest height (seen as the height indicating line 132) of any point of the head 106 of the intake valve 102 from the reference plane 122. More specifically this relationship may be one and one half times the greatest height of any point of the head 106 of the intake valve 102 from the reference plane 122.

The height of the bulge 118, seen as the height indicating line 134 may be at least one third in magnitude of the bore of the cylinder 116, seen as an arrow 140.

The height of the bulge 118, seen as the height indicating line 134, may be in a range of about thirty-seven percent to forty-three percent in magnitude compared to the magnitude of the bore 140 of the cylinder 116.

Figure 3:
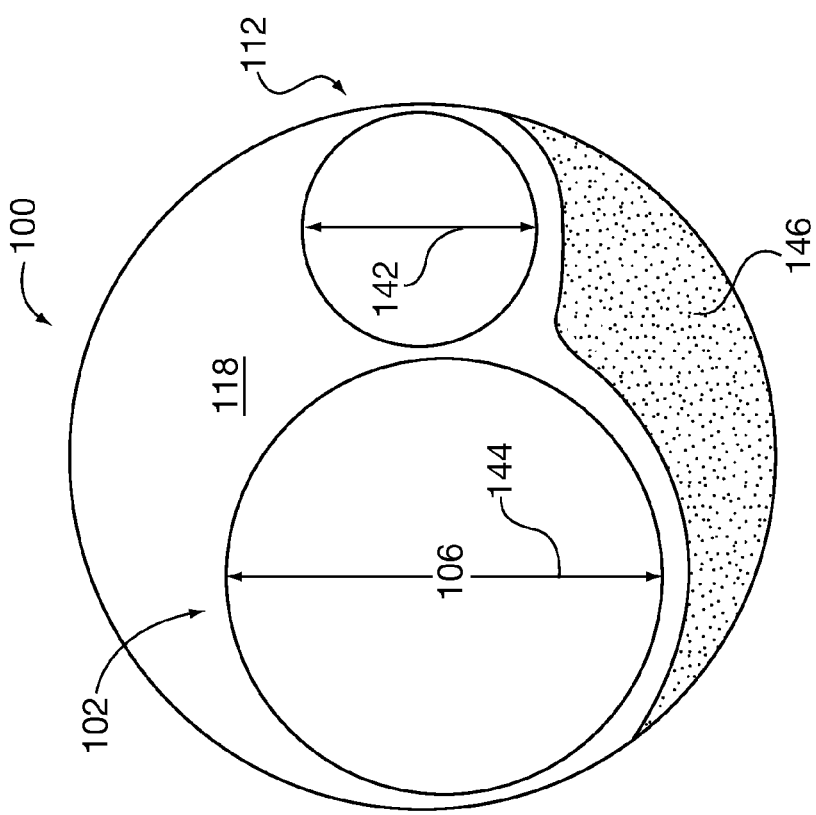
FIG. 3 is a bottom plan view of the combustion chamber of FIG. 1.

Referring now to FIG. 3, the exhaust valve 112 may have a valve head diameter 142, and the intake valve 102 may have a valve head diameter 144 in a range of about forty to fifty percent greater than the magnitude of the valve head diameter 142 of the exhaust valve 112. More preferably, the intake valve 102 may have a valve head diameter 144 in a range of about forty-five to fifty percent greater than the magnitude of the valve head diameter 142 of the exhaust valve 112.

Figure 7:
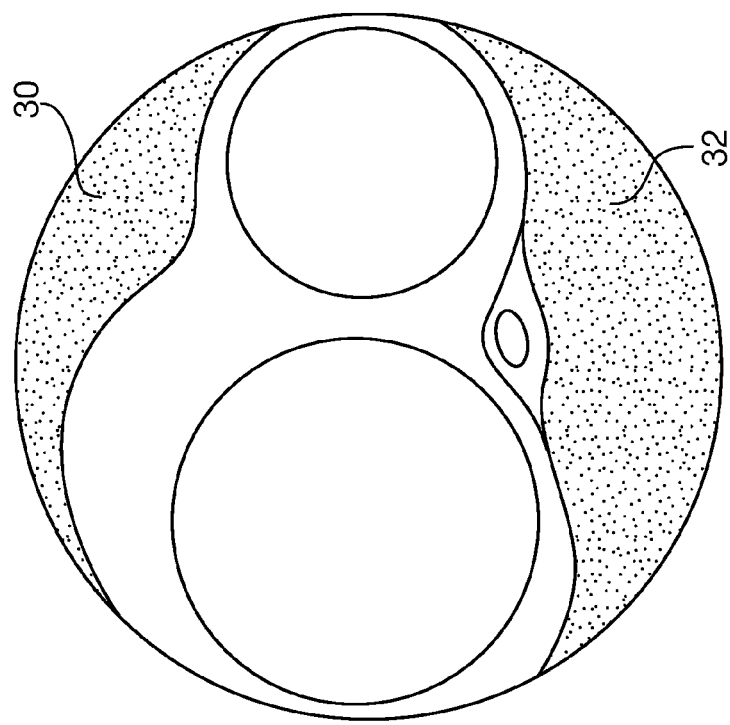
FIG. 7 is a bottom plan view of the subject of FIG. 6.

The combustion chamber design of FIG. 3 may be compared with the prior art design of FIG. 7. It will be seen that a flat plateau 30 (see also FIG. 6) is absent in the novel design, although a flat plateau 146 (called out in FIGS. 3 and 4) may be present. The area in the novel combustion chamber assembly 100 which would otherwise contain a corresponding flat plateau now defines the bulge 118.

Figure 5:
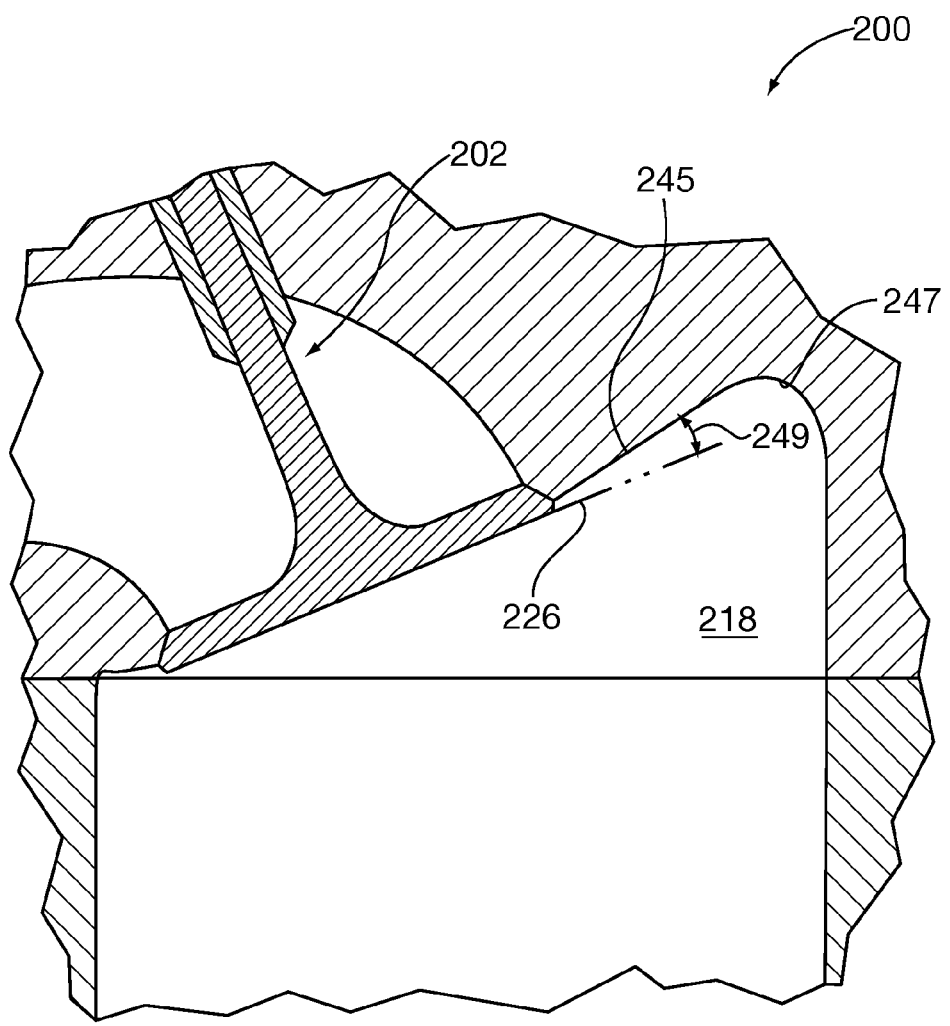
FIG. 5 is a diagrammatic cross sectional view of a portion of a cylinder head comprising a combustion chamber incorporating characteristics according to at least one further aspect of the present invention.

Referring now to FIG. 5, a variation on the bulge profile of FIG. 4 is shown. In a cylinder head assembly 200, which may in other ways be the structural and functional equivalent of the cylinder head assembly 100, a bulge 218 corresponding to the bulge 118 of FIG. 4 may have a wall portion 245 located proximate the head 206 of the intake valve 202 which is flat and linear for at least a part of its extent from the head 206 of the intake valve 202 to that point 247 of the bulge 218 which is farthest from the piston (not seen in FIG. 5) when considered in the cross section of FIG. 5, which also cross sects the intake valve 202. An angle 249 existing between the wall portion which is flat and linear and the valve head plane 226 of the intake valve 202 may be in a range of ten to twenty degrees, and more specifically may be about fifteen degrees.

According to one aspect of the invention, the above characteristics may be provided in engines wherein within each cylinder, the intake valve 106 has an axis of travel 138, which may coincide with the geometric longitudinal axis of the stem 108. Although not shown, because the exhaust valve 112 may be similar in construction and operation to the intake valve 102, the exhaust valve 112 has an axis of travel (not shown) which is parallel to the axis of travel 138 of the intake valve 102. This is a popular layout since it enables a very compact cam-in-block engine design to be realized.

In such engines, and as seen in FIG. 1, the intake valve 102 has a valve head diameter (seen as line 142) in a range of about fifty to about sixty-two percent of the magnitude of the bore 140 (see FIG. 4) of the cylinder 116. More preferably, this range may be about fifty-five to about fifty-seven percent of the magnitude of the bore 140 of the cylinder 116.

Effectiveness of the present invention has been demonstrated in flow tests conducted on cylinder heads such as the cylinder heads 14, 16 modified to reflect the novel characteristics. A cylinder head modified according to the novel principles set forth herein and commercially available high performance cylinder heads for high performance or racing engines were compared as to flow characteristics. The commercially available cylinder heads were the products of Air Flow Research, 28611 W. Industry Drive, Valencia, Calif. 91355 (model 235); Chevrolet, P.O. Box 3317, Detroit, Mich. 48232 (engine model LS1), and Joe Gibbs Racing, 13415 Reese Boulevard West, Huntersville, N.C. 28078. (engine model SB2.2). The products of Air Flow Research and Joe Gibbs Racing were flow tested. Comparable statistics for the Chevrolet product were obtained from published sources which are publicly available over the internet.

Flow testing was conducted using a model Superflow 600 flow bench, a product of Superflow, 4060 Dixon Street, Des Moines, Iowa 50313, at QMP Racing, 9530, Owensmouth Avenue, No. 2, Chatsworth, Calif. 91311, under conditions of barometric pressure of twenty-eight inches.

TABLE 1

| Valve lift, inches | Chevrolet Air flow, CFM | Research Air flow, CFM | Joe Gibbs Racing Air flow, CFM | Present Invention Air flow, CFM |
|---|---|---|---|---|
| 0.100 | 64 | 50 | 50 | 56 |
| 0.200 | 136 | 142 | 125 | 162 |
| 0.300 | 196 | 213 | 213 | 260 |
| 0.400 | 217 | 256 | 289 | 323 |
| 0.500 | 224 | 293 | 346 | 388 |
| 0.600 | 230 | 314 | 369 | 435 |
| 0.700 | 235 | 322 | 381 | 461 |
| 0.800 | 235 | 329 | 386 | 478 |
| 0.900 | 235 | 330 | 388 | 486 |
| 1.000 | 235 | 330 | 388 | 499 |
| Bore, inches | 4.155 | 4.155 | 4.155 | 4.155 |
| Intake valve diameter, inches | 2.00 | 2.125 | 2.18 | 2.35 |

Flow values from table 1 indicate a considerable disparity in air flow rates, which disparity is out of proportion to the relative intake valve sizes. This disparity increases with increased valve lift.

Engines and major components thereof may be commercially available in various states of completeness. These may range from bare engine block and cylinder head castings to complete assemblies bearing a number of additional components necessary or desirable for engine operation. Therefore, the invention may be regarded as taking the form of any of a bare cylinder head modified to incorporate combustion chamber characteristics set forth herein, absent valves and other moving and stationary parts ordinarily fixed to and supported by the cylinder head, ranging to a complete cylinder head having valves, valve springs, valve guides, and other conventional parts of cylinder heads, and to engine assemblies which may be complete and operable, or incomplete. An example of the latter is an engine block containing crankshaft, camshaft and associated apparatus such as lifters or tappets and pushrods where used, connecting rods, and pistons, and one or more cylinder heads provided with the novel combustion chamber characteristics, but without supporting apparatus such as oil pump, coolant pump, alternator, external pulleys, drive belts, drive chains, or the like, starter motor, and ignition components. The above listing of components should be regarded as illustrative only, and not as limiting.

Where defined in terms of a cylinder head, the invention will be understood to comprise a cylinder head such as the cylinder head 14, intended for a reciprocating piston internal combustion engine such as the engine assembly 12. The cylinder head may comprise a combustion chamber such as the combustion chamber 14 for each cylinder, a bottom face 34 (see FIG. 2) which corresponds to the deck 28, an induction path disposed to conduct fresh combustion air to each cylinder, such as the port 104, and an exhaust path disposed to conduct spent combustion products away from each cylinder, such as is provided in part by the exhaust manifolds 20 and 22, and their associated ports (not visible) formed in the cylinder head assemblies 14 and 16. The cylinder head will be understood to comprise a bulge such as the bulge 118 or the bulge 218. It will be understood that the bulge 118 or 218 has a wall portion located proximate the head of the intake valve which has a slope such as the slot S1 of FIG. 4, which is arranged at an acute angle to the bottom face of the cylinder head which is greater than an acute angle such as the acute angle 128 of the intake valve head plane 126 relative to the bottom face of the cylinder head when the cylinder head is installed in the reciprocating piston internal combustion engine. When considering the invention as a cylinder head, the bottom face 34 of the cylinder head (also called out in FIG. 4) may be substituted for the reference plane 122 for purposes of defining novel structure.

The present invention contemplates engines having more than two valves serving each cylinder. Illustratively, three, four, and five valve designs may enjoy the benefits of the present invention. Where more than one intake valve is provided and these intake valves are not coplanar, a reference plane may be established arbitrarily by any selected one of the intake valves.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible

I claim:

1. A reciprocating piston internal combustion engine, comprising:
    an engine block supporting at least one cylinder enclosing a piston slidably and reciprocably disposed within the cylinder;
    an output shaft supported by the engine block;
    a power linkage which operably conducts power developed by reciprocation of the piston within its associated cylinder to the output shaft; and
    a cylinder head defining therein a combustion chamber for each cylinder, an induction path disposed to conduct fresh combustion air to each cylinder, and an exhaust path disposed to conduct spent combustion products away from each cylinder, wherein the combustion chamber closes one end of the cylinder;
    for each cylinder, an intake valve disposed in the induction path, which is disposed to open and close the induction path to flow of fresh combustion air to each cylinder, and having an intake valve head;
    for each cylinder, an exhaust valve disposed in the exhaust path to open and close the combustion chamber to the exhaust path, and having an exhaust valve head and wherein
    the axis of each cylinder defines a reference plane disposed perpendicularly to the axis and located between the valves and the piston;
    that portion of the head of the intake valve facing the combustion chamber defines an intake valve head plane disposed at an acute angle to the reference plane; and
    the combustion chamber comprises a bulge formed in the open space of the combustion chamber, which said bulge projects away from the piston and opens towards the piston, wherein the bulge has a distal portion located further from the piston than any part of the head of the intake valve is located from the piston, and wherein the bulge has a wall portion located proximate the head of the intake valve which has a slope which is arranged at an acute angle to the reference plane which is greater than the acute angle of the intake valve head plane relative to the reference plane, wherein said wall portion is located proximate the head of the intake valve, said wall portion being flat and linear for at least a part of its extent from the head of the intake valve to that point of the bulge which is farthest from the piston when considered in a cross section, said wall portion also intersecting with the head of the intake valve, and wherein the angle existing between the wall portion which is flat and linear and the valve head plane of the head of the intake valve is in a range of ten to twenty degrees.

2. A reciprocating piston internal combustion engine, comprising:
    an engine block supporting at least one cylinder enclosing a piston slidably and reciprocably disposed within the cylinder;
    an output shaft supported by the engine block;
    a power linkage which operably conducts power developed by reciprocation of the piston within its associated cylinder to the output shaft; and
    a cylinder head defining therein a combustion chamber for each cylinder, an induction path disposed to conduct fresh combustion air to each cylinder, and an exhaust path disposed to conduct spent combustion products away from each cylinder, wherein the combustion chamber closes one end of the cylinder;
    for each cylinder, an intake valve disposed in the induction path, which is disposed to open and close the induction path to flow of fresh combustion air to each cylinder, and having an intake valve head;
    for each cylinder, an exhaust valve disposed in the exhaust path to open and close the combustion chamber to the exhaust path, and having an exhaust valve head, and wherein
    the axis of each cylinder defines a reference plane disposed perpendicularly to the axis and located between the valves and the piston;
    that portion of the head of the intake valve facing the combustion chamber defines an intake valve head plane disposed at an acute angle to the reference plane; and
    the combustion chamber comprises a bulge formed in the open space of the combustion chamber, which said bulge projects away from the piston and opens towards the piston, wherein the bulge has a distal portion located further from the piston than any part of the head of the intake valve is located from the piston, and wherein the bulge has a wall portion located proximate the head of the intake valve which has a slope which is arranged at an acute angle to the reference plane which is greater than the acute angle of the intake valve head plane relative to the reference plane, wherein said wall portion located is proximate the head of the valve head of the intake valve, said wall portion being flat and linear for at least a part of its extent from the head of the intake valve to that point of the bulge which is farthest from the piston when considered in a cross section, said wall portion also intersecting with the intake valve, and wherein the angle existing between the wall portion which is flat and linear and the valve head plane of the head of the intake valve is about fifteen degrees.

* * * * *